United States Patent
Wang et al.

(10) Patent No.: US 10,531,276 B2
(45) Date of Patent: Jan. 7, 2020

(54) METHOD AND APPARATUS FOR INTELLIGENT COMMUNICATION SELECTION

(71) Applicant: Samsung Electronics Co., Ltd, Suwon-si (KR)

(72) Inventors: Yifei Wang, Sunnyvale, CA (US); Shyam Prasad, Mountain View, CA (US); Rathinamoorthy Mylsamy, Mountain View, CA (US); Bulent Kasman, Mountain View, CA (US); Peng Ning, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/239,813

(22) Filed: Aug. 17, 2016

(65) Prior Publication Data
US 2017/0055303 A1 Feb. 23, 2017

Related U.S. Application Data

(60) Provisional application No. 62/208,280, filed on Aug. 21, 2015.

(51) Int. Cl.
*H04W 8/22* (2009.01)
*H04W 80/00* (2009.01)

(52) U.S. Cl.
CPC ............. *H04W 8/22* (2013.01); *H04W 80/00* (2013.01)

(58) Field of Classification Search
None
See application file for complete search history.

(56) References Cited

U.S. PATENT DOCUMENTS

| | | | |
|---|---|---|---|
| 8,462,671 B2 * | 6/2013 | Rinne | H04B 1/44 370/276 |
| 2008/0238610 A1 * | 10/2008 | Rosenberg | G06Q 20/20 340/5.7 |
| 2009/0116431 A1 * | 5/2009 | Cadieux | H04W 48/18 370/329 |
| 2014/0006510 A1 * | 1/2014 | Hamilton | H04W 8/24 709/204 |
| 2015/0214758 A1 * | 7/2015 | Toya | H01M 2/1016 320/112 |

* cited by examiner

*Primary Examiner* — Anh Ngoc M Nguyen

(57) ABSTRACT

A method is provided for wireless data transfer. The method includes determining, at a mobile device, communication capability of another device for receiving data. The method also includes selecting an optimal communication protocol for communicating the data based on the determined communication capability. The method also includes communicating the data with the other device using the selected optimal communication protocol.

20 Claims, 11 Drawing Sheets

METHOD AND APPARATUS FOR INTELLIGENT COMMUNICATION SELECTION

CROSS-REFERENCE TO RELATED APPLICATION(S) AND CLAIM OF PRIORITY

This application claims priority under 35 U.S.C. § 119(e) to U.S. Provisional Patent Application No. 62/208,280 filed on Aug. 21, 2015, entitled "REAL-TIME CONTACTLESS PAYMENT METHOD SWITCHING ALGORITHM AND SYSTEM." The content of the above-identified patent document is incorporated herein by reference.

TECHNICAL FIELD

This disclosure relates generally to wireless data transfer. More specifically, this disclosure relates to a method and apparatus for intelligent communication selection.

BACKGROUND

A point of sale (POS) terminal may have a near field communication (NFC) reader, magnetic stripe reader, or both. A NFC reader can support payment with NFC-enabled cards or devices, while a magnetic stripe reader can support payment with magnetic stripe cards or magnetic stripe transmission (MST)-enabled devices. For devices supporting more than one contactless payment methods (such as NFC and MST), NFC and MST may not be processed at the same time due to the limitation of the device or POS terminal.

SUMMARY

Embodiments of the present disclosure a method and apparatus for intelligent communication selection.

In one example embodiment, a method is provided for wireless data transfer. The method includes determining, at a mobile device, communication capability of another device for receiving data. The method also includes selecting an optimal communication protocol for communicating the data based on the determined communication capability. The method also includes communicating the data with the other device using the selected optimal communication protocol.

In another example embodiment, an apparatus is provided for wireless data transfer. The apparatus includes a memory element configured to store data. The apparatus also includes at least one processor coupled to the memory element. The at least one processor is configured to determine communication capability of another device for receiving data. The processor is also configured to select an optimal communication protocol for communicating the data based on the determined communication capability. The processor is also configured to communicate the data with the other device using the selected optimal communication protocol.

In yet another example embodiment, a non-transitory computer-readable medium is provided for wireless data transfer. The non-transitory computer-readable medium comprising instructions for wireless data transfer that, when executed by at least one processor, causes an electronic device to determine communication capability of another device for receiving data. The instructions also cause the processor to select an optimal communication protocol for communicating the data based on the determined communication capability. The instructions also cause the process to communicate the data with the other device using the selected optimal communication protocol.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

One or more embodiments of this disclosure recognize and take into account that a device or application on the device may choose a payment method in real time according to the payment method(s) supported by terminals. It can be difficult to determine which payment method to use for payment on the terminals without user involvement because different point of sell (POS) terminals may support different payment methods and the device (or application) is unaware of which methods are supported when a payment procedure starts.

Figure 1:
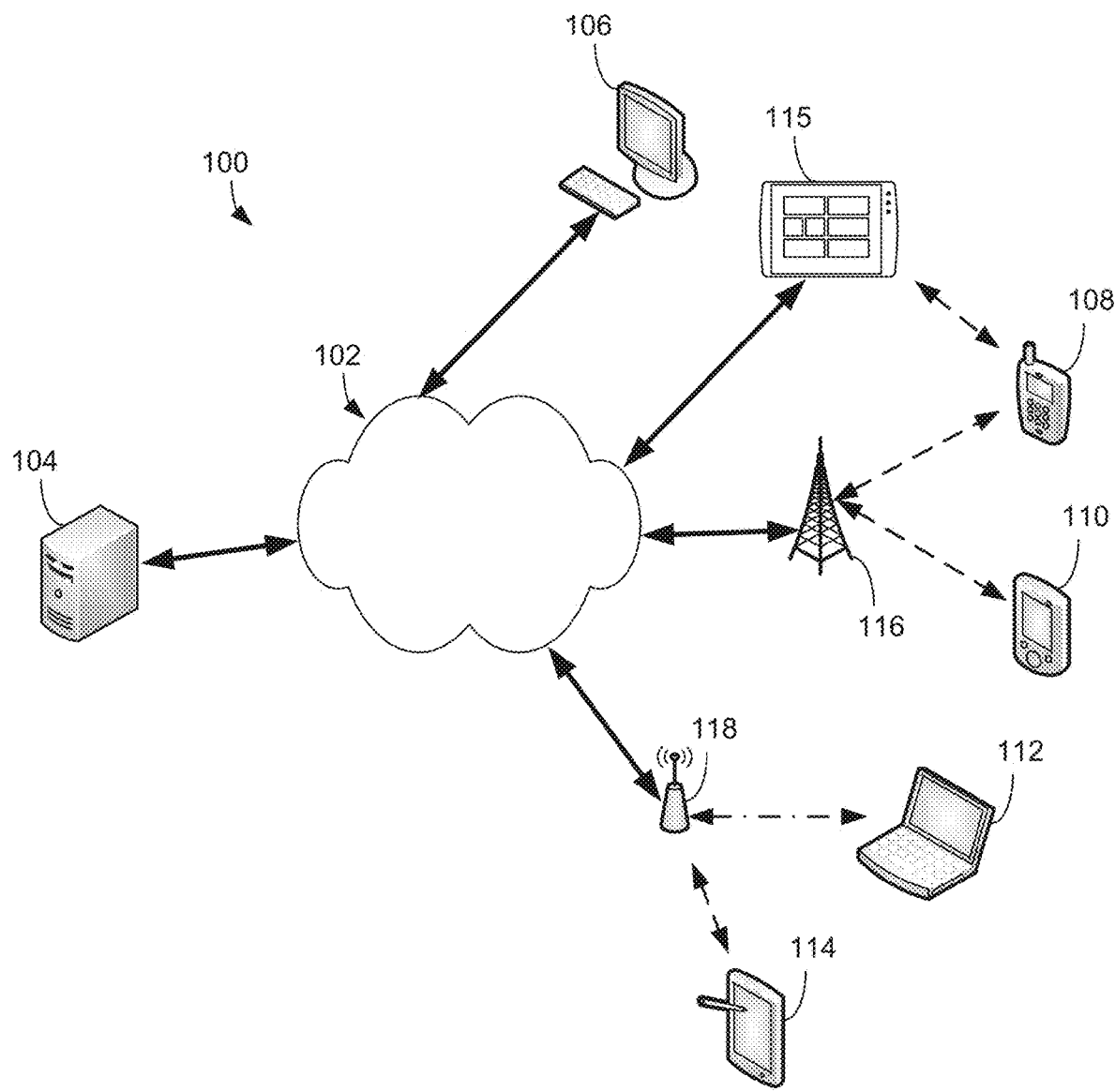
FIG. 1 illustrates an example computing system in which one or more embodiments of the present disclosure may be implemented.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, Asynchronous Transfer Mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-115. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-115 represents any suitable computing or processing device that interacts with at least one server or other computing device(s) over the network 102. In this example, the client devices 106-115 include a desktop computer 106, a mobile telephone or smartphone 108, a personal digital assistant (PDA) 110, a laptop computer 112, a tablet computer 114, and a payment device 115. However, any other or additional client devices could be used in the computing system 100.

In this example, some client devices 108-115 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, a smartphone 108 (or other client device 110-114) can provide a real-time user-friendly payment method switching process and system. Some payment methods, for example NFC, allow two-way communication between a payment device 115, such as a point of sale (POS) terminal and the smartphone 108 (or other client device 110-114). Other payment methods, for example MST, only allow one-way communication from smartphone 108 to payment device 115.

The process and system provided in this disclosure allow contactless payment when more than one contactless payment method is present in a device or application. The process and system provided in this disclosure can select correct payment methods in real time, without user input, for applications (or devices) supporting more than one contactless payment methods when performing payments on a payment device 115, regardless of whether the contactless payment methods provided by the payment device 115 are one-way or two-way communication.

Using the above process, a payment switching system can intelligently decide which payment method should be used when a user taps a mobile device with supported application on a payment device supporting NFC and/or MST contactless payment(s). The system allows the user tap the device on a supported contactless payment reader without offering payment method information. The system can process the payment method switch fast enough to make sure payment procedure can be finished within industry standard required time. The system also has the ability to stop an unwanted payment method timely to ensure there is no influence on the ongoing payment.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
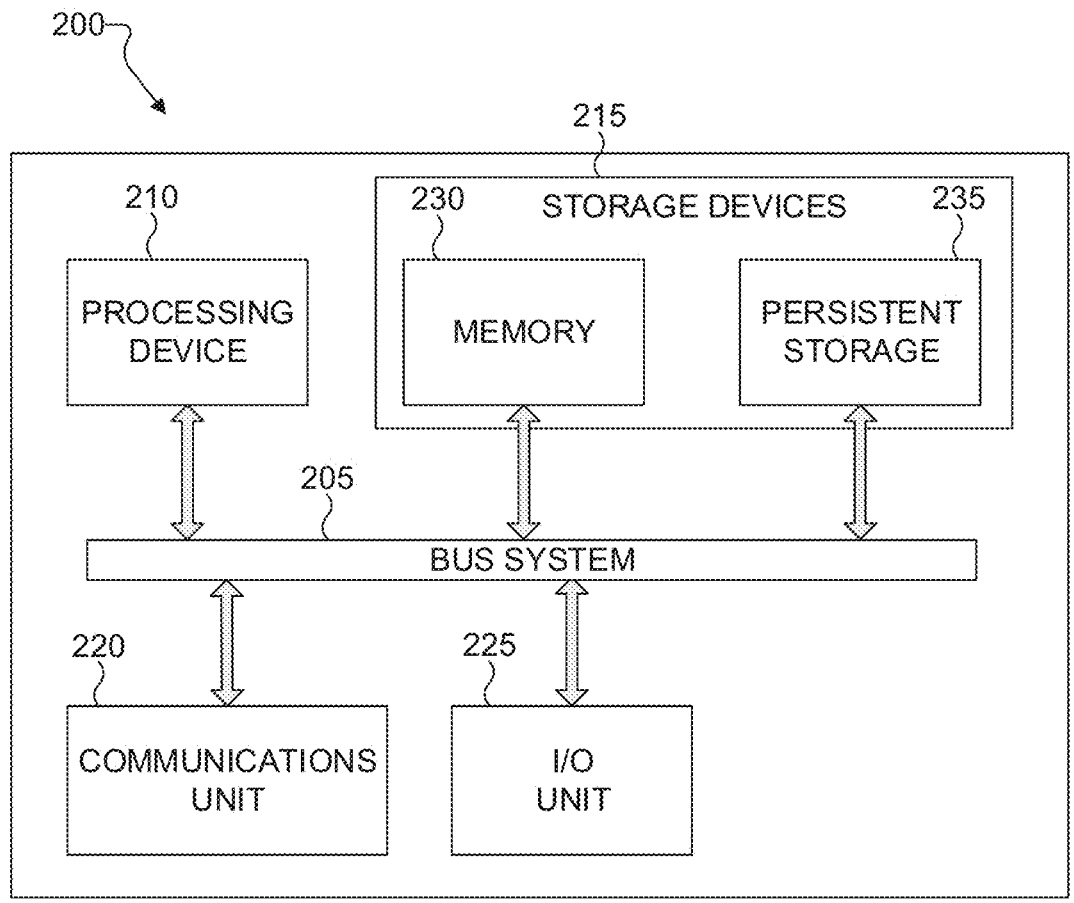
FIGS. 2 and 3 illustrate example devices in a computing system in which one or more embodiments of the present disclosure may be implemented
Figure 3:
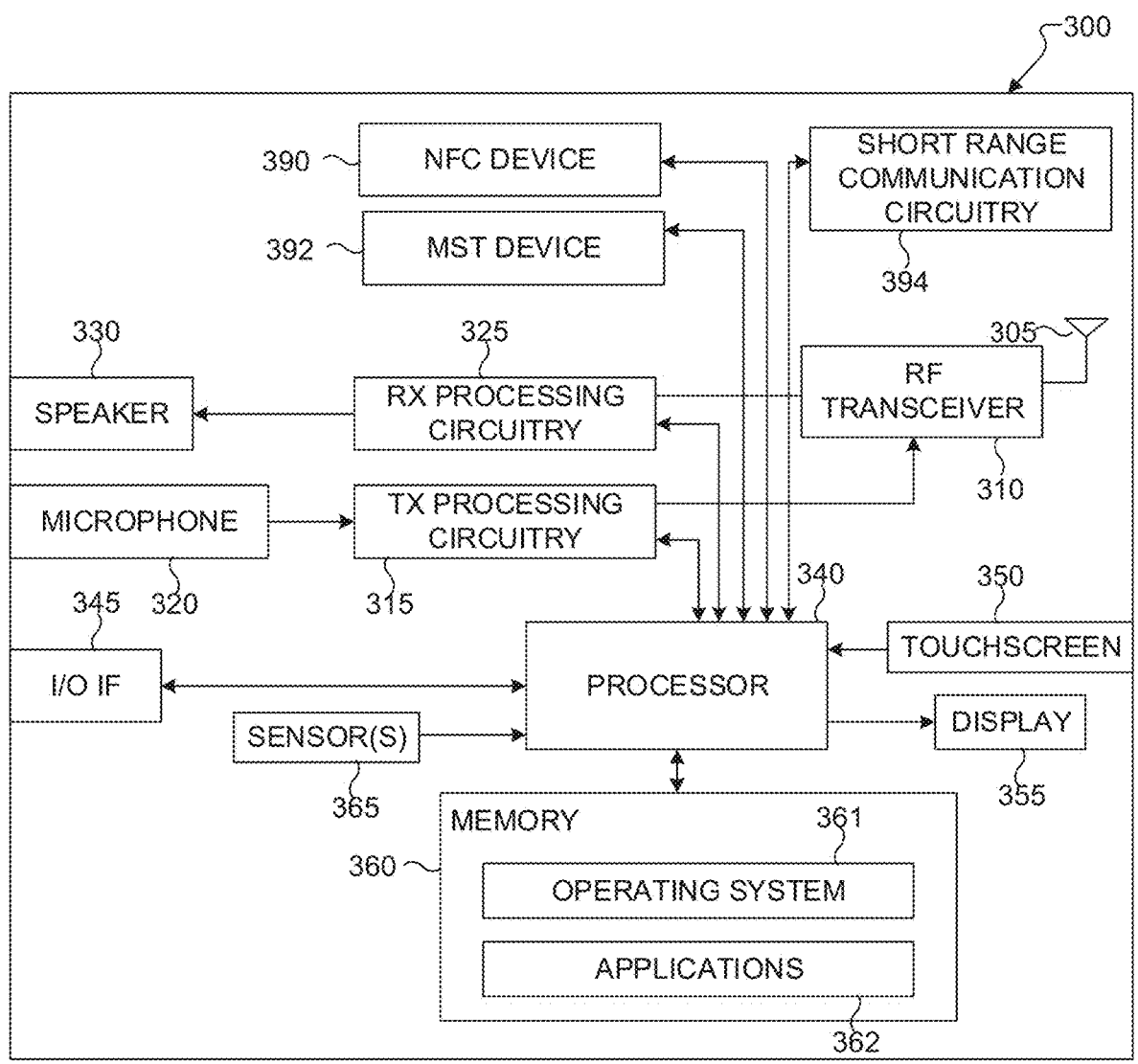

FIGS. 2 and 3 illustrate example devices in a computing system according to this disclosure. In particular, FIG. 2 illustrates an example server 200, and FIG. 3 illustrates an example UE 300. The server 200 could represent the server 104 in FIG. 1, and the UE 300 could represent one or more of the client devices 106-115 in FIG. 1.

As shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Note that while FIG. 2 is described as representing the server 104 of FIG. 1, the same or similar structure could be used in one or more of the client devices 106-115. For example, a laptop or desktop computer could have the same or similar structure as that shown in FIG. 2.

FIG. 3 illustrates user equipment (UE) 300 in which one or more embodiments of the present disclosure may be implemented. The embodiment of the UE 300 illustrated in FIG. 3 is for illustration only, the UE 300 comes in a wide variety of configurations, and FIG. 3 does not limit the scope of this disclosure to any particular implementation of a UE.

In various embodiments, the UE 300 may take different forms, and the present disclosure is not limited to any particular form. For example, the UE 300 may be a mobile communication device, such as, for example, a mobile station, head mountable display, a subscriber station, a wireless terminal, a smart phone, a tablet, etc., that is useable with data transfer applications, such as payment applications.

As shown in FIG. 3, the UE 300 includes an antenna 305, a radio frequency (RF) transceiver 310, transmit (TX) processing circuitry 315, a microphone 320, and receive (RX) processing circuitry 325. The UE 300 also includes a speaker 330, a processor 340, an input/output (I/O) interface (IF) 345, a touchscreen 350, a display 355, a memory 360, one or more sensors 365, an NFC device 390, magnetic stripe transmission (MST) device 392, and other short range circuitry 394. The memory 360 includes an operating system (OS) 361 and one or more applications 362. NFC device 390 and MST device 392 may be examples of short range communication circuitry 394. Short range communication circuitry 394 can include additional communication interfaces, such as Bluetooth, ZIGBEE, infrared, etc. In different embodiments, each of the elements 390-394 can be a part of the same circuitry, separate pieces of circuitry, or included as part of the processing circuitry 325 and 315.

The RF transceiver 310 receives, from the antenna 305, an incoming RF signal transmitted by an access point (e.g., base station, Wi-Fi router, Bluetooth device) for a network (e.g., a Wi-Fi, Bluetooth, cellular, 5G, LTE, LTE-A, WiMAX, or any other type of wireless network). The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 300. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 300 with the ability to connect to other devices, such as laptop computers and handheld computers. The I/O interface 345 is the communication path between these accessories and the processor 340.

The processor 340 is also coupled to the touchscreen 350 and the display 355. The operator of the UE 300 can use the touchscreen 350 to enter data and/or inputs into the UE 300. The display 355 may be a liquid crystal display, light-emitting diode (LED) display, optical LED (OLED), active matrix OLED (AMOLED), or other display capable of rendering text and/or graphics, such as from websites, videos, games, etc.

The memory 360 is coupled to the processor 340. Part of the memory 360 could include a random access memory (RAM), and another part of the memory 360 could include a Flash memory or other read-only memory (ROM).

UE 300 further includes one or more sensors 365 that can meter a physical quantity or detect an activation state of the UE 300 and convert metered or detected information into an electrical signal. For example, sensor 365 may include one or more buttons for touch input, e.g., on the headset or the UE 300, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 365 can further include a control circuit for controlling at least one of the sensors included therein. The sensor(s) 365 can be used to determine an orientation and facing direction of the UE for a video. Any of these sensor(s) 365 may be located within the UE 300, within a headset configured to hold the UE 300, or in both the headset and UE 300, for example, in embodiments where the UE 300 includes a headset.

The NFC device 390 can wirelessly transmit and receive data with other NFC devices. In one example, NFC device 390 can be used to transmit and receive data for payment transactions. The NFC device 390 can emit and/or receive a predetermined Radio Frequency (RF) within a predetermined region, and upon receiving a response message with respect to the emitted RF from the portable terminal 101, performs an NFC service. The NFC service may include, for example, a terminal mode, a card mode (or NFC card mode), and a Peer-To-Peer (P2P) mode. The terminal mode executes a function of reading a tag and inputting information to the tag; the card mode executes a transportation card or credit card function; and the P2P mode executes a function of sharing data. For example, the data may include business card or multimedia data.

The MST device 392 includes a driver and an inductor, and the MST device 392 is configured to receive the stream of pulses from the processor 340, to amplify and shape the received stream of pulses, and to generate and emit high energy magnetic pulses including data. The data can include magnetic stripe data of a payment card. The inductor is driven by a series of timed current pulses that result in a series of high energy magnetic pulses that resemble the fluctuating magnetic field created by a moving magnetic stripe. In one example embodiment, a payment application is programmed to be associated with a pre-selected payment card and activating of the payment application initiates the emission of high energy magnetic pulses including the magnetic stripe data of the pre-selected payment card.

The touchscreen 350 can include a touch panel, a (digital) pen sensor, a key, or an ultrasonic input device. The touchscreen 350 can recognize, for example, a touch input in at least one scheme among a capacitive scheme, a pressure sensitive scheme, an infrared scheme, or an ultrasonic scheme. The touchscreen 350 can also include a control circuit. In the capacitive scheme, the touchscreen 350 can recognize touch or proximity.

As described in more detail below, the UE may include circuitry for and applications for MST and NFC communications. Although FIG. 3 illustrates one example of UE 300, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs).

As another example, the NFC device 390 and/or MST device 392 can be combined into a single device, combined with the circuitry 315 and 325, or combined with RF transceiver 310. Also, while FIG. 3 illustrates the UE 300 configured as a mobile telephone, tablet, or smartphone, the UE 300 could be configured to operate as other types of mobile or stationary devices.

As described in more detail below, the UE 300 can be one example of any of client devices 108-115 for the use of selecting a method for transferring data. The UE 300 can be used to remotely access information, on a server, such as server 104 of FIG. 1 or server 200 of FIG. 2, about the communication methods of another device. Additionally, the UE 300 can be used to select a payment method for a payment process with another device.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 300 configured as a mobile telephone or smartphone, client devices could be configured to operate as other types of mobile or stationary devices. In addition, as with computing and communication networks, UEs and servers can come in a wide variety of configurations, and FIGS. 2 and 3 do not limit this disclosure to any particular UE or server.

Figure 4:
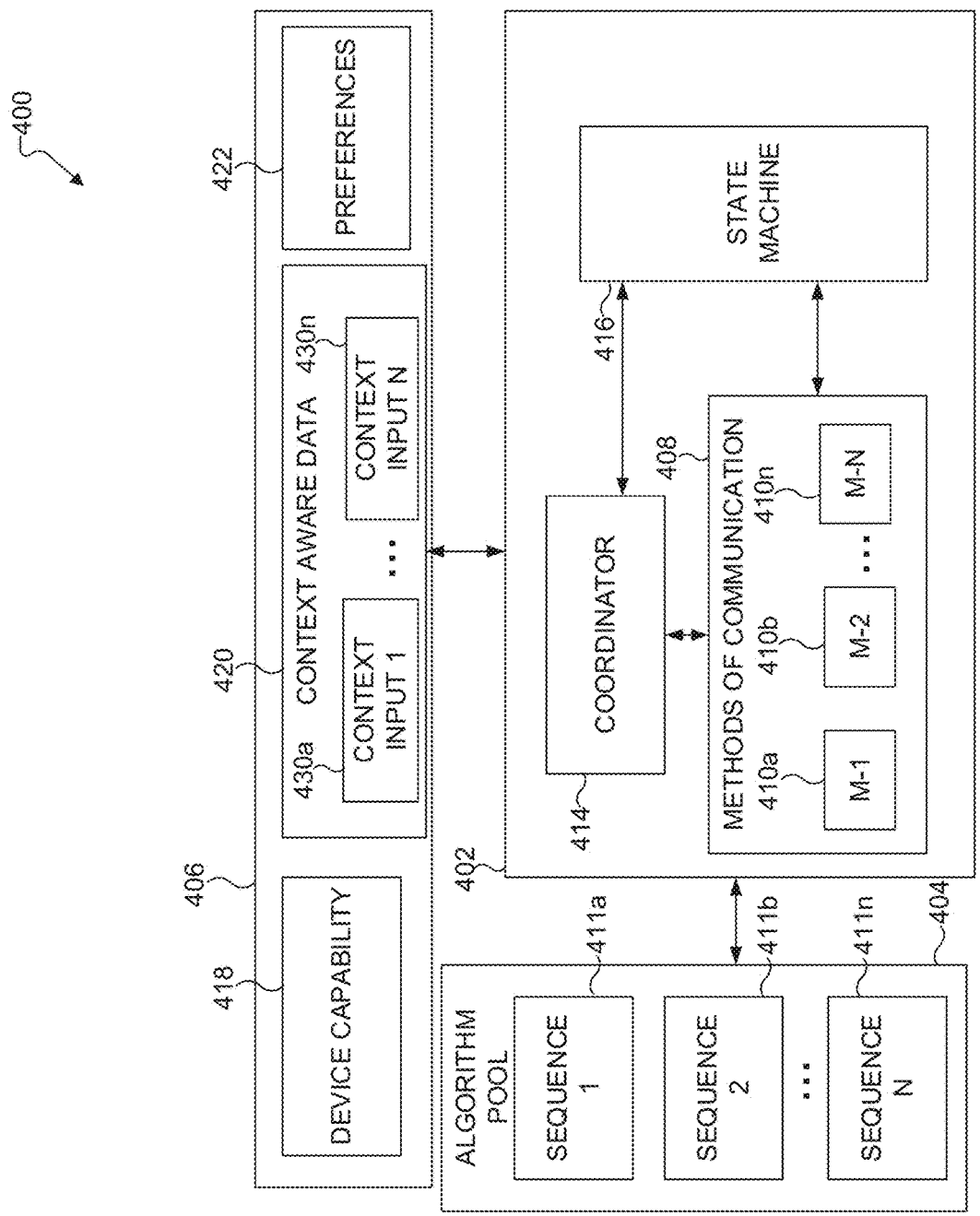
FIG. 4 illustrates a communication method switching system for communication method selection in accordance with an embodiment of this disclosure.

Various embodiments of this disclosure recognize and take into account that when using only MST payments, the payment can only be made on a POS terminal with a magnetic stripe reader, otherwise, the payment will fail. Similarly, when using only NFC payments, the payment can only be made on a NFC-enabled POS terminal, otherwise, the payment will fail. One or more embodiments of this disclosure provide a payment method switching system that can dynamically update a payment method to make payment on the functioning reader of the payment device. The payment method switching system offers a user-friendly experience because users are not required to understand the capabilities of the payment device or manually select the payment method on the mobile device. The payment method switching system can be one example of a communication method switching system FIG. 4 illustrates a communication method switching system 400 for communication method selection in accordance with an embodiment of this disclosure. The embodiment of the system 400 illustrated in FIG. 4 is for illustration only. Systems for a communication selection can come in a wide variety of configurations, and FIG. 4 does not limit the scope of this disclosure to any particular implementation of a system for a communication selection.

In FIG. 4, the system 400 includes device 402, switching algorithm pool 404, and parameters 406. The system 400 can utilize pool 404 to select a communication sequence. In the system 400, coordinator is responsible to communicate with all the major components, update communication state machine and coordinate the communication method switches.

The device 402 can be one example of UE 300 as shown in FIG. 3. The device 402 includes available methods 408 for communication. In this example, the methods 408 include interfaces M-1 410a, M-2 410b, . . . M-n 410n. These interfaces can include, for example, MST and NFC among other short range communication methods. The methods 408 of communication can include one and/or two way communication methods. Device 402 also includes coordinator 414, which is responsible to communicate with all the major components, update communication state machine, and coordinate the communication method switches. The coordinator 414 connects different communication interfaces, such as one-way and two-way communication interfaces. The coordinator 414 synchronizes the state, and handles the communication switching logic. The device 402 also includes a state machine 416 to perform as a reference monitor. The state machine 416 maintains all types of states and determines whether communication method switching can or should be performed after switching algorithm pool 404 provides an order to switch communication methods.

In one embodiment, the methods 408 can include a one-way communication interface. The interface supports one-way communication (such as M-1 410*a*). This interface can give commands to transmit data or stop the related communication method in a timely manner. In this embodiment, the methods 408 also include a two-way communication interface. This interface supports two-way communication (such as M-2 410*b*). This interface can give commands to related communication method to transmit data or stop the related communication method in a timely manner.

In one example embodiment, M-1 is MST and M-2 is NFC. M-1 410*a* can send commands to MST data transmitting components to initiate or stop M-1 data transmission. M-2 410*b* can bridge the communication between outside and internal NFC communication process module. As a standalone module, M-2 410*b* can hook to all kinds of NFC card emulations including card emulation with SE or HCE service so both SE and HCE can be supported in the communication method switching system.

The switching algorithm pool 404 can include instructions configured to select an optimal communication sequence 411-411*n*, which use the methods 408 for communication. That is, the switching algorithm pool 404 can include switching logic to decide which communication method should be used at a specific moment. The switching algorithm pool 404 can provide an order to the device 402 to change communication methods. In one embodiment, the switching algorithm pool 404 can be stored within the device 402. In another embodiment, the switching algorithm pool 404 can be stored within a server, such as server 200 in FIG. 2.

When communication method switching occurs, coordinator 414 updates the state and notifies both M-2 410*b* and M-1 410*a*. Both interfaces check the state and update their behaviors. If the state machine 416 shows a communication method should transition from active state to inactive state, the active interface can stop the current communication method and the coordinator 414 can switch to a new interface.

Parameters 406 can include device capability 418, context aware data 420, and preferences 422. Parameters 406 can be stored at a server, such as server 200 in FIG. 2, or on a client device, such as client device 108. Parameters 406 is data that can affect the typical selection process by switching algorithm pool 404. Device capability 418 can include known communication method types that a particular device can utilize. For example, the device 402 may be able to access information indicating that a particular communication device only uses one-way communication. This information can then be used to refine the communication method selection process. Context aware data 420 can utilize context inputs 430*a*-430*n* to further narrow or help select different methods of communication 408. For example, the context inputs can be location, Wi-Fi and/or cell information used to identify devices available for the location, user habits of using phones and apps to identify preferred payment options. Context aware data 420 can also take into account the time of day. Context aware data 420 can also include sensor data collected from sensors like accelerometer, gyroscope, digital compass, barometer as well as other contextual features. Preferences 422 can include user or issuer preferences. The user preferences can be specific to device 402 specify preferred communication methods, exclude specific communication methods, or provide an ordered preference of communication methods. The issuer preferences can be specific to the other device or communication device in communication with the device 402. The issuer preferences can also specify preferred communication methods, exclude specific communication methods, or provide an ordered preference of communication methods. In additional embodiments, the preferences 422 can include historical data, such as a common selection by the user or prior communications with the specific communication device by other users.

Although FIG. 4 illustrates an example communication method switching system 400 for communication method selection, various changes may be made to FIG. 4. For example, different components of the system 400 could be combined, further subdivided, or omitted and additional components could be added according to particular needs. As a particular example, preferences 422 can be stored within device 402.

Figure 5:
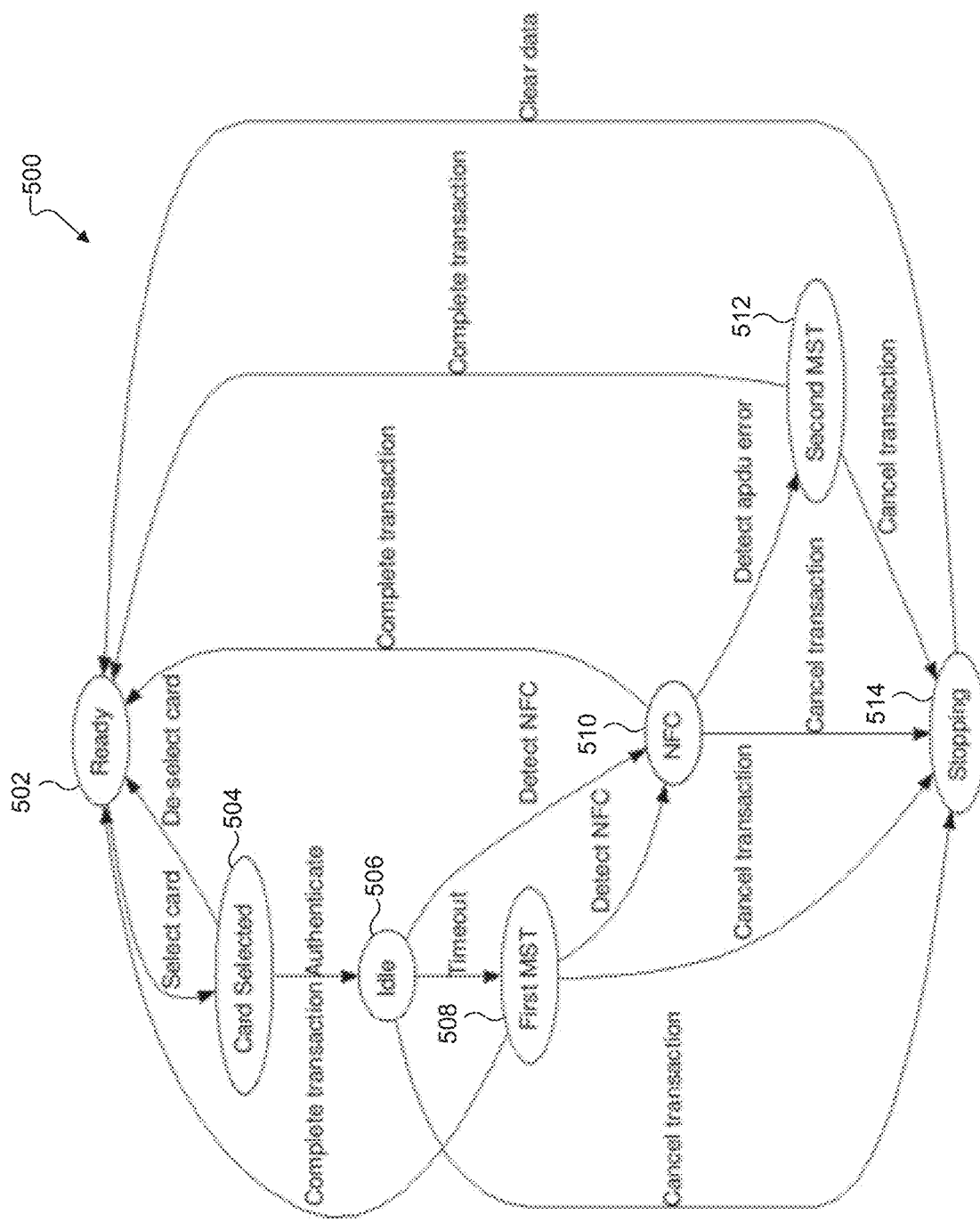
FIG. 5 illustrates a state diagram in accordance with an embodiment of this disclosure.

FIG. 5 illustrates a state diagram 500 in accordance with an embodiment of this disclosure. FIG. 5 represents an example for a device that includes two forms of communication, MST and NFC. In an embodiment of this disclosure, a state diagram can notify other components of a communication method selection system 400 of the current state of the communication method selection process.

In FIG. 5, the state begins at a ready state 502. The ready state 502 indicates a state where the device is ready to begin the selection or communication process. The device may have one or more pre-loaded payment cards, such as a credit card, with payment information. The payment cards can be loaded into an application on the device. In this application, when one of the cards is selected, the process can move to a card selected state 504. During this state, the device can perform an authentication process with the selected card. Once authentication is finished, the process can move to an idle state 506.

In the idle state 506, the device can temporarily wait for a communication signal. For example, the device can monitor for an NFC signal. The wait can be for a period of time. If the period of time elapses without the communication signal, the process can move to a first MST state 508. If the NFC signal is detected, the process can move to the NFC state 510.

In the first MST state 508, the device can attempt to perform a transaction using the MST interface. If the communication fails, the transaction can be canceled and the diagram can move to stopping state 514. If the communication succeeds, the transaction can be completed and the diagram can move to ready state 502. If the NFC signal is detected during the first MST state 508, the process can move to the NFC state 510.

In the NFC state 510, the device can attempt to perform a transaction using the NFC interface. If the communication fails, the transaction can be canceled and the diagram can move to stopping state 514. If the communication succeeds, the transaction can be completed and the diagram can move to ready state 502. If an application data protocol unit (APDU) error is detected during the NFC state 510, the process can move to the second MST state 512.

In the second MST state 512, the device can attempt to perform a transaction using the MST interface. If the communication fails, the transaction can be canceled and the diagram can move to stopping state 514. If the communication succeeds, the transaction can be completed and the diagram can move to ready state 502.

Once the device has reached the stopping state 514, the data can be cleared and the process can return to the ready state 502.

Although FIG. 5 illustrates an example state diagram 500 for communication method selection, various changes may be made to FIG. 5. For example, different states of the diagram 500 could be combined, further subdivided, or omitted and additional states could be added according to particular needs. As a particular example, a second MST state 512 could be removed or other communication methods for performing transactions can be added.

Figure 6:
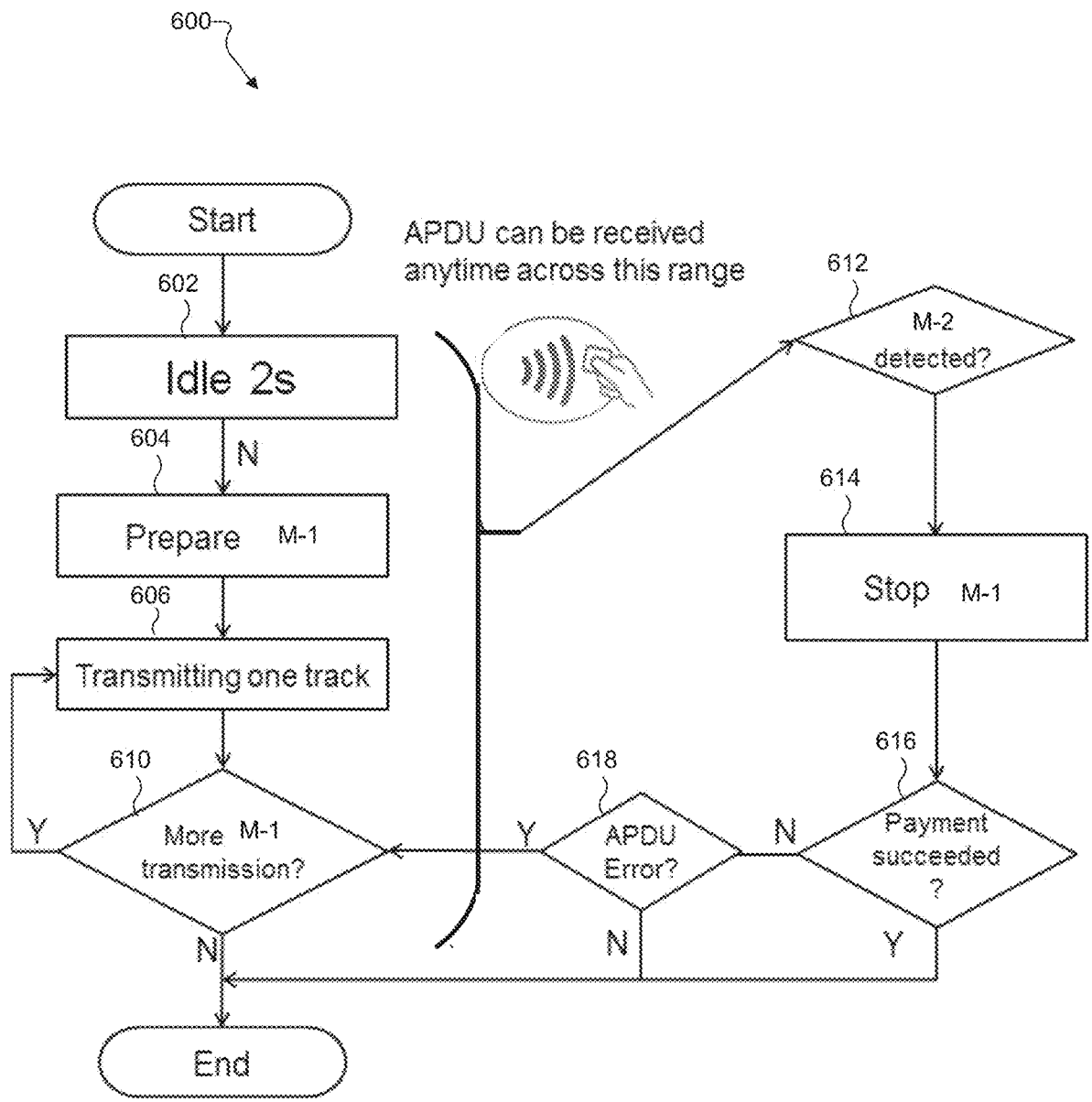
FIG. 6 illustrates a communication method selection process used to select a communication method in accordance with an embodiment of this disclosure.

FIG. 6 illustrates a communication method selection process 600 used to select a communication method in accordance with an embodiment of this disclosure. The process 600 illustrated in FIG. 6 is for illustration only. Processes used to select a communication method can come in a wide variety of configurations, and FIG. 6 does not limit the scope of this disclosure to any particular implementation of communication method selection process.

In FIG. 6, the process 600 begins by, at step 602, a device temporarily waiting for a communication signal. For example, the device can monitor for an M-2 signal, such as an NFC signal. The wait can be for a period of time. If the period of time elapses without the communication signal, at step 604, the device can prepare another communication interface, for example an M-1 interface, such as an MST interface. The device can attempt to perform a transaction using the MST interface. At step 606, the device can transmit one track of data to another device. At step 610, the device can determine whether there is more data to send. If there is more data, the device can send more data at step 606. The loop between steps 606 and 610 continues until all data is sent and then the process 600 ends.

At step 612, the device determines whether the initial communication signal M-2 (e.g., the NFC signal) is detected at any time during steps 602-610. If the initial communication signal M-2 (e.g., the NFC signal) is detected at any time during steps 602-610, at step 614, the device can stop the other communication process M-1, e.g., the MST process. The device can begin an M-2 process, such as an NFC process. At step 616, the device determines whether a payment succeeded. If the payment succeeded, then the process 600 ends. If the payment did not succeed, then at step 618, the device determines whether the failure is due to an application protocol data unit (APDU) error.

If the failure was due to an ADPU error, then the device can restart the M-1 process at step 610. The M-1 process steps 606 and 610 are repeated until the transaction is complete.

Although FIG. 6 illustrates an example process 600 for communication method selection, various changes may be made to FIG. 6. For example, different steps of the process 600 could be combined, further subdivided, or omitted and additional steps could be added according to particular needs. As a particular example, the M-2 steps 612-618 could be removed.

FIGS. 7A-7E illustrates exemplary timelines for transaction sequences in accordance with an embodiment of this disclosure. The transactions sequences indicate a timing and order to the steps based on a state machine. Different example time periods are shown in FIGS. 7A-7E. In different embodiments, other time periods can also be used. Each of the sequences begins at T=0 with an idle period. In these examples, the idle period is 1800 ms. In other examples, the idle period can be other time periods. In one or more embodiments, the idle period starts after a successful authentication of the payment information.

Figure 7A:
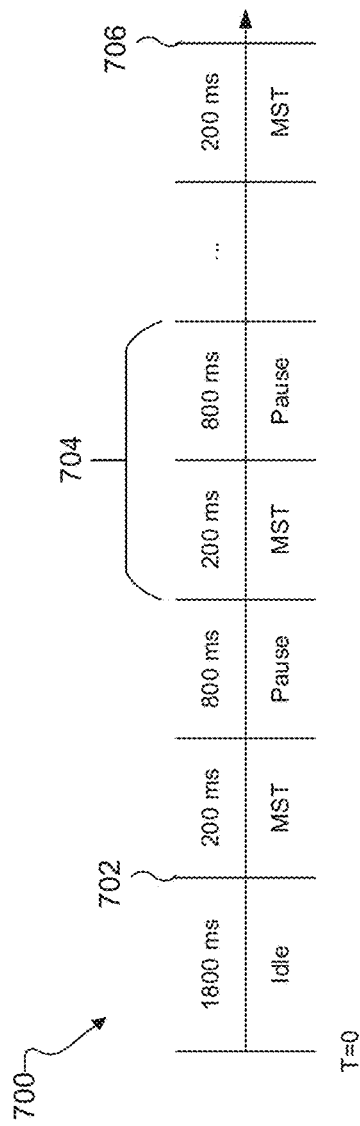
FIGS. 7A-7E illustrates a timelines for transaction sequences in accordance with an embodiment of this disclosure.

FIG. 7A represents a transaction sequence for using only an MST interface. In FIG. 7A, an MST process starts at the end of the idle period 702. In this example, sending data using MST takes 200 ms. Once the data is sent, another pause occurs for 800 ms. This processing of sending data and pausing repeats 704 until all data is sent. When the final data is sent, the MST process ends at 706.

Figure 7B:
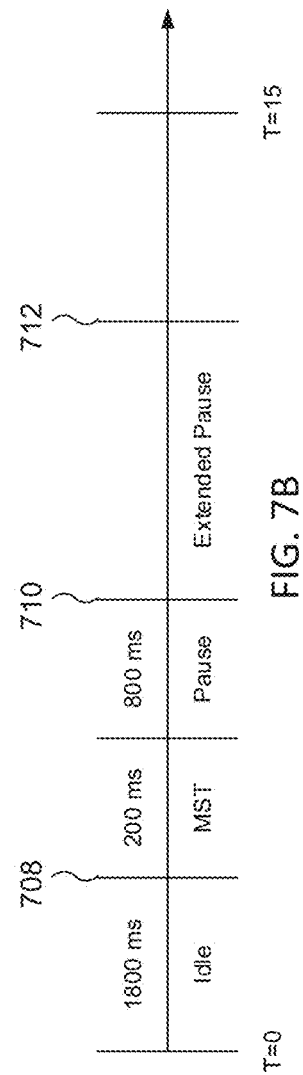

FIG. 7B represents a transaction sequence for using an MST interface and transitioning to an NFC interface. In FIG. 7B, an MST process starts at the end of the idle period 706. In this example, sending data using MST takes 200 ms. Once the data is sent, another pause occurs for 800 ms. During the MST process, the system switches to an NFC process and pauses the MST process at 710. During an extended pause, the NFC process proceeds by selecting a proximity payment system environment (PPSE), selecting application identifiers (AIDs), executing a get processing options (GPO) command, performing a read record process, and other possible APDU commands. After the NFC process is complete, the MST is exited, and the NFC succeeds at 712.

Figure 7C:
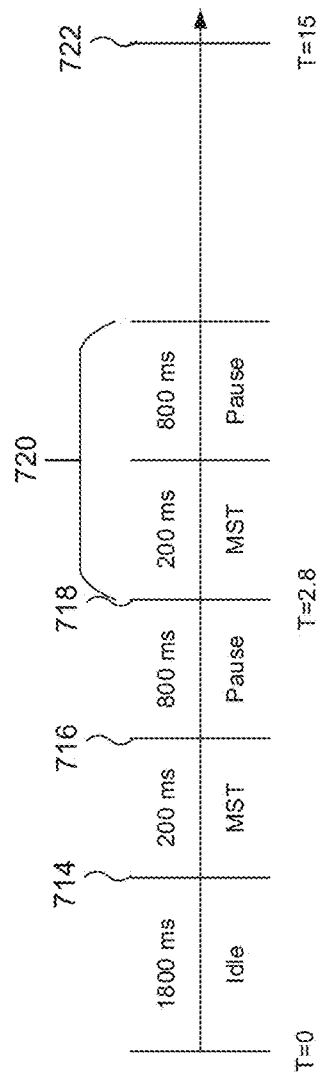

FIG. 7C represents a transaction sequence for using only an MST interface, transitioning to an NFC interface, and then transitioning back to the MST interface. In FIG. 7C, an MST process starts at the end of the idle period 714. In this example, sending data using MST takes 200 ms. Once the data is sent, another pause occurs for 800 ms. During the MST process, the system switches to an NFC process and pauses the MST process at 716. During the pause of MST, the NFC process proceeds. If the NFC process fails at 718, the MST process resumes and the MST loop is resent. This processing of sending data and pausing using MST repeats 720 until all data is sent. When the final data is sent, the MST process ends at 722.

Figure 7D:
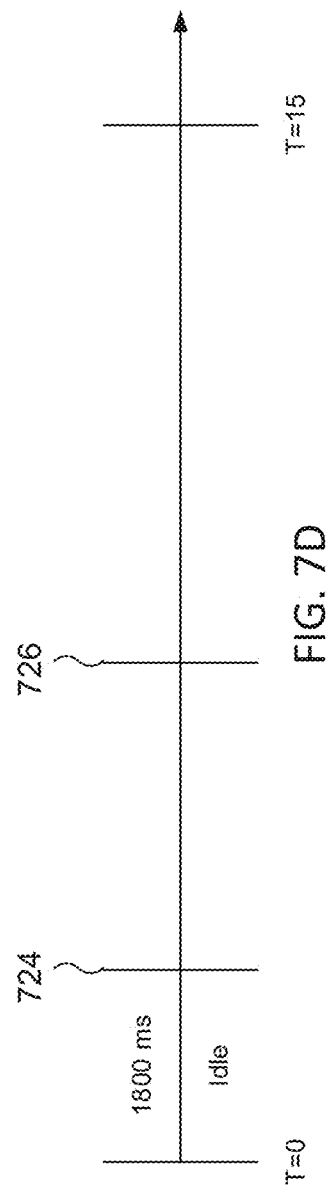

FIG. 7D represents a transaction sequence for using only an NFC interface. In FIG. 7D, an NFC process proceeds at any time including the idle period 724. At 726, the NFC process succeeds. In this sequence, the NFC may also fail and retry.

Figure 7E:
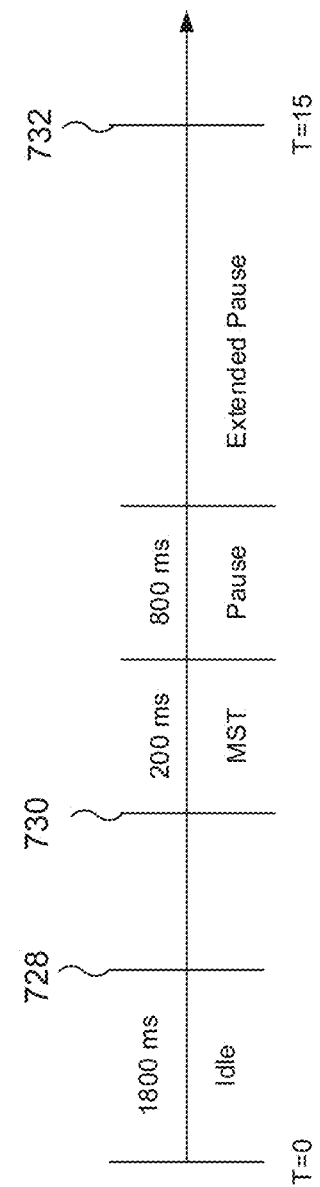

FIG. 7E represents a transaction sequence for using only an NFC interface and transitioning to an MST interface. In FIG. 7E, an NFC process proceeds at any period including the idle period 728. If the NFC process fails at 730, the MST process starts and the MST transmission loop begins. This processing of sending data and pausing using MST repeats until all data is sent. When the final data is sent, the MST process ends at 732.

Figure 8A:
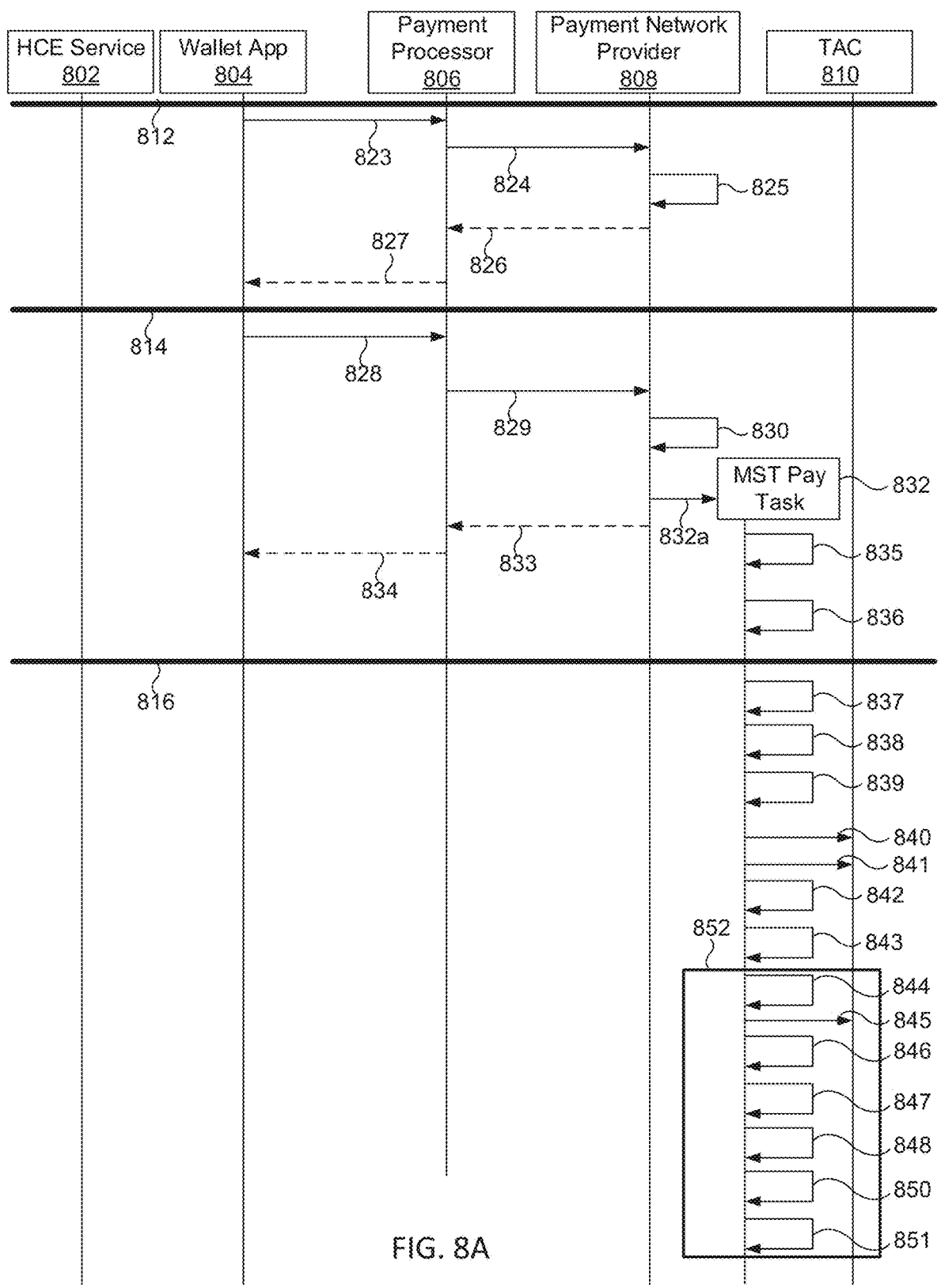
FIGS. 8A-8B illustrate a command diagram for a payment sequence in accordance with an embodiment of this disclosure.
Figure 8B:
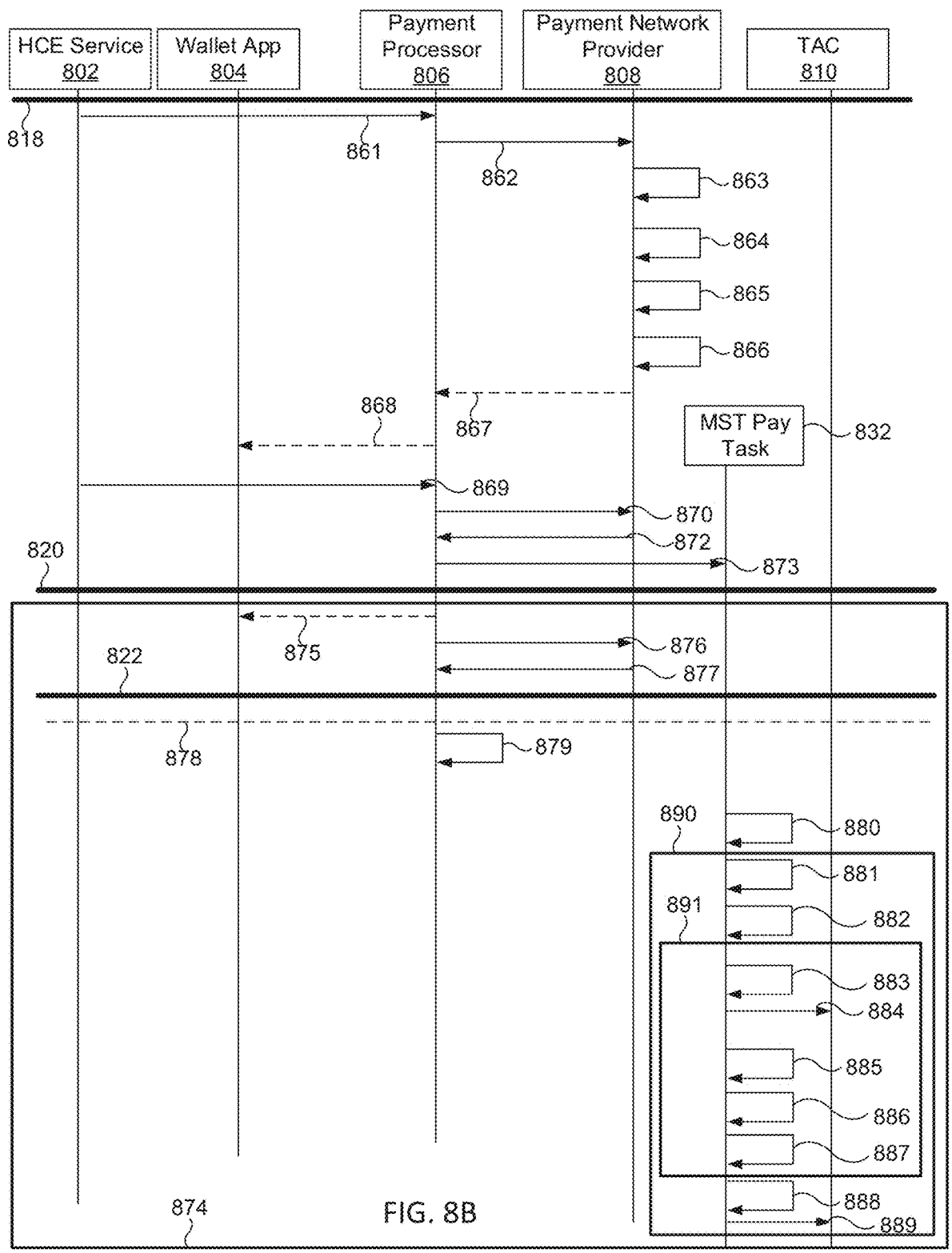

FIGS. 8A-8B illustrate a command diagram 800 for a payment sequence in accordance with an embodiment of this disclosure. The steps in FIG. 8B continue the diagram 800 in FIG. 8A. The diagram 800 includes host card emulation (HCE) service 802, application 804, payment processor 806, network provider 808, and a terminal adapter controller (TAC) 810. This command diagram 800 is for illustration only and different portions may be rearranged, added, or removed in different embodiments.

The command diagram 800 begins at 812 by showing the sequence for selecting a card for payment, wherein the state may transition from ready to card selected. At 823, the application 804 sends the command to select a card along with the token ID and callback information to processor 806. An example command can be selectCard(String tokenid, SelectCardCallback cb). At 824, the processor 806 sends the command to select a card along with the provider token key to provider 808. An example command can be selectCard (ProviderTokenKey providerTokenKey). At 825, the provider 808 sets the state to "card selected," for example, state 504 in FIG. 5. An example command can be setState(CARD SELECTED). At 826 and 827 the indication of the set state is returned to the application 804.

At 814, the diagram 800 transitions from card selected to idle. At 828, the application 804 sends a command to start payment to processor 806. An example command can be startPay(SecuredObject secObj. PayConfig payConfig, IPayCallback cb). Processor 806 forwards the start payment command to provider 808 at 829. An example command can be startPay(PayConfig payConfig, SecuredObject secObj. PayResponse callback). Provider 808 authenticates the transaction at 830. An example command can be authenticateTransaction(SecuredObject secObj.). Provider 808, at 832a, sends a command to start an MST pay process to the MST Pay Task interface 832. An example command can be startMstPayTask. At 833 and 834, the indication of the start of the MST process is returned to the application 804. At 835, the interface 832 sets the state as idle, for example state 506 in FIG. 5. An example command can be setState(IDLE). At 836, the interface 832 then executes the command to idle to wait for a communication signal, such as an NFC signal. An example command can be sleep(idleTime).

At 816, the diagram 800 transitions from idle to First MST. At 837, interface 832 executes a command to set the state to First_MST to begin the MST process, such as state 508 in FIG. 5. An example command can be setState (FIRST_MST). At 838, the interface 832 executes a command to get an MST configuration. An example command can be getMstPayConfig( ) At 839, the interface 832 executes a command to prepare for an MST payment. An example command can be prepareMstPay( ). At 840 the interface 832 can send a command to TAC 810 to turn on the MST process. An example command can be turnOnMst( ). At 841, the interface 832 also sends a command to move the running core of the terminal adapter (TA) from the default core of the processor to a fourth core of the processor to the TAC 810 to prepare the TA environment. An example command can be moveSecOsToCore4( ). In different embodiments, different cores can be used. At 842, the interface 832 executes a command to check whether the state is an MST state. An example command can be checkinState(FIRST_MST SECOND_MST). At 843, the interface 832 executes a command to see if there is an NFC signal. An example command can be waitIfInNFCState( ).

At 844, the interface 832 executes a command to start the MST pay process. An example command can be startMstPay (baudRate, mstPayConfig). At 845, the interface 832 can sends send data by MST. An example command can be a command transmitMstData(baudRate, mstPayConfig). At 846, the interface 832 executes the command to check the state. An example command can be checkinState(FIRST_MST SECOND_MST). At 847, interface 832 can execute a command wait on an MST process if in an NFC state. An example command can be waitIfInNFCState( ). At 848, the interface 832 executes a command to delay. An example command can be sleep(delayTime). At 850, the interface 832 executes a command to check the state. An example command can be checkinState(FIRST_MST SECOND_MST). At 851, the interface 832 executes a command to wait on an MST process if in an NFC state. An example command can be waitIfInNFCState( ) Commands 844-851 can operate in a loop until all data is sent, or an exit is triggered, such as if an NFC signal is received.

At 818, the diagram 800 transitions from First MST to NFC. At 861, the HCE service sends a command to process an ADPU to processor 806. An example command can be processCommandApdu(commandApdu). At 862, the processor 806 forwards the command to provider 808. The provider 808 executes the commands to process an ADPU at 863, prepare for NFC payment at 864, set the state to NFC at 865, and turn on the payment interfaces at 866. Example commands can be processApdu(commandApdu), at 863, prepareNfcPay( ) at 864, the command setState(NFC) at 865, and onSwitch(MST,NFC) at 866. The command setState(NFC) sets the state to NFC, such as state 510 in FIG. 5. The indication that command onSwitch(MST,NFC) was executed is returned at 867 and 868 to application 804. At 869, the HCE service sends a command to deactivate the interface to processor 806. An example command can be onDeactivated(reason). At 870, the processor 806 sends the command to indicate the transfer is complete to provider 808. An example command can be processTransactionComplete(reason). At 872, the provider 808 sends an error command to processor 806. An example command can be errorCommand, errorCode. At 873, the processor 806 sends a command to wake up the MST pay process to interface 832. An example command can be wakeupMstPayTask.

At 820, the diagram 800 transitions from NFC to ready. Steps 879-889 can be used in an optional embodiment 874. Additionally, steps 881-889 can be used in an optional embodiment 890. At 875, the processor sends a command indicate completion of the payment process to application 804. An example command can be onFinish(selected TokenId, NFC, ApduReasonCode). At 876, the processor sends the command clear the card command to provider 808. An example command can be clearCard( ). At 877, provider 808 indicates the clear card command was executed to processor 806.

At 822, the diagram 800 transitions from NFC to Second MST. At 878, an ADPU response contains an error. At 879, the processor 806 executes a command to set the state to the second MST, such as state 512 in FIG. 5. An example command can be setState(SECOND_MST). The interface checks the current state executes at 880, clears the card at 881, resets the loop at 882 and starts an MST process at 883. Example commands can be checkCurrentState( ) at 880, clearCard( ) at 881, restLoop( ) at 882, and startMstPay (baudRate, mstPayConfig) at 883. At 884, the interface 832 transmits data for the MST transfer to TAC 810. An example command can be sends a command transmitMstData (baudRate, mstPayConfig). The interface 832 then checks the state at 885, delays time at 885, checks state at 887, and clears the card at 889. Example commands can be checkinState(FIRST_MST SECOND_MST) at 885, sleep(delayTime) at 886, checkinState(FIRST_MST SECOND_MST) at 887, and clearCard( ) at 889. Steps 883-887 can operation in a loop until all data is transferred for the payment. At 890, the interface 832 sends the command to move the running core of the TA from the default core of the processor to a fourth core of the processor to the TAC 810 to prepare the TA environment. An example command can be moveSecOsToCore4( ). In different embodiments, different cores can be used.

Although FIGS. 8A-B illustrates an example process for selecting a payment method, various changes could be made to FIGS. 8A-8B. For example, while shown as a series of steps, various steps in each figure could overlap, occur in parallel, occur in a different order, or occur multiple times. Although FIGS. 8A-B demonstrates an example process with Trusted Execution Environment (TEE) for processing NFC and MST data, various environments including Secure Element (SE) could be mixed and used to perform similar functional tasks. FIG. 8B can be a continuation of the sequence presented in 8A.

Figure 9:
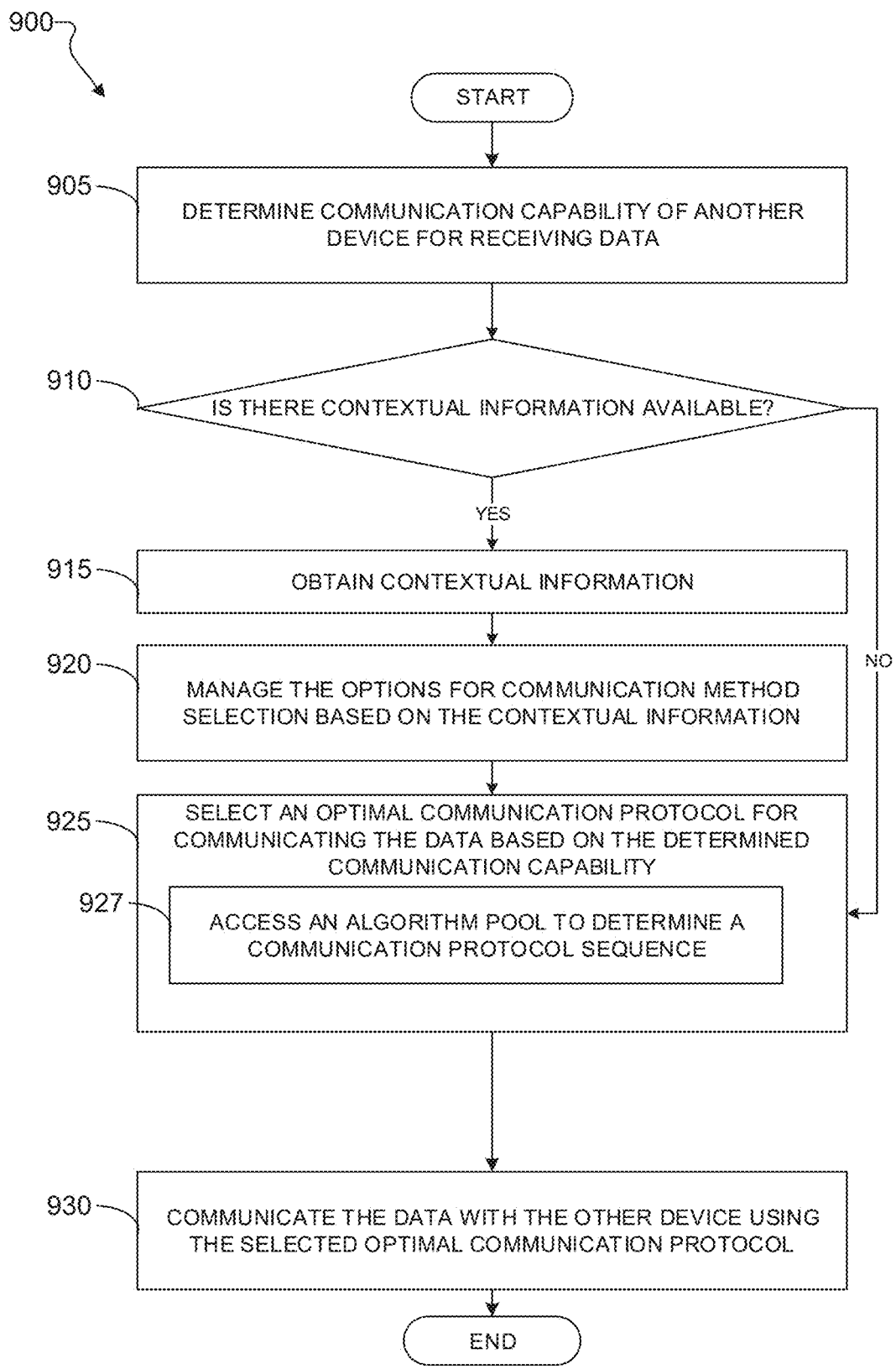
FIG. 9 illustrates a process for wireless data transfer according to embodiments of the present disclosure.

FIG. 9 illustrates a process 900 for wireless data transfer according to embodiments of the present disclosure. The process 900 depicted in FIG. 9 may be performed by the UE 300 or different components of the UE 300 in FIG. 3, or the server 200 or different components of server 200 in FIG. 2.

At step 905, the process 900 begins with the UE 300 determining a communication capability of another device for receiving data. In different embodiments, the data is use to perform a wireless payment. The data can be information related to a credit card, debit card, bank account, or other payment information. The communication capability can be determined by monitoring for a reception of signals using different communication protocols.

In another embodiment, the communication capability can be determined through the use of device information retrieved from a server. In yet another embodiment, the communication capability can be determined through the use of contextual data, such as location information. At step 910, the UE 300 can determine whether contextual information is available. The contextual information can include location data or user preferences. If there is contextual information available, then at step 915, the UE obtains the contextual information. The contextual information can be retrieved from a server 200 or within the UE 300. Then at step 920, the UE 300 can manage the options available for selecting a communication method based on the contextual information.

At step 925, the UE 300 can select an optimal communication protocol for communicating the data based on the determined communication capability. The selection can further be based on the contextual information. At step 927, which can be performed as part of step 925, the UE 300 can access a switching algorithm pool to determine the communication protocol sequence to select. The switching pool can indicate a process for selection of a protocol as used in FIGS. 6 and 8A-8B. The UE 300 can also use user and other device preferences in selecting a protocol. For example, the user or other device may restrict the types of protocols available for use, or the preferences may indicate a priority protocol.

At step 915, the UE 300 communicates the data with the other device using the selected optimal communication protocol. This communication can be started in one protocol and then transferred to another protocol. For example, when the optimal protocol is not available, a less optimal protocol may be used, and then the optimal protocol may be used when available. In different embodiments, the optimal protocol may be MST, NFC, bar codes, quick response codes, or some other type of wireless protocol.

Although FIG. 9 illustrates an example process for wireless data transfer, various changes could be made to FIG. 9. For example, while shown as a series of steps, various steps in each figure could overlap, occur in parallel, occur in a different order, or occur multiple times. For example, step 927 is performed in FIG. 9 as part of step 925, but in can be in separate steps in various embodiments. Additionally, in one embodiment, steps 910-920 are not part of process 900.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for wireless data transfer, the method comprising:
   determining, at a mobile device, communication capability of another device for receiving data;
   selecting, by the mobile device, from a plurality of protocols including a one way communication protocol and a two-way communication protocol, an optimal communication protocol for communicating the data based on the determined communication capability, the one way communication protocol comprising a magnetic stripe transmission (MST) protocol; and
   communicating the data with the other device using the selected optimal communication protocol.

2. The method of claim 1, wherein determining the communication capability further comprises determining whether a wireless signal, from the other device, using a first communication protocol is detected during a predetermined period of time; and
   the selecting the optimal communication protocol further comprises:
   responsive to detecting the wireless signal in the first communication protocol during the predetermined period of time, identifying the first communication protocol as the selected optimal communication protocol; and
   responsive to failing to detect the wireless signal in the first communication protocol during the predetermined period of time, identifying a second communication protocol as the selected optimal communication protocol.

3. The method of claim 2, further comprising:
   responsive to detecting the wireless signal in the first communication protocol during the communication of the data to a terminal using the second communication protocol:

stopping communication of the data in the second communication protocol; and communicating the data to the terminal using the first communication protocol.

4. The method of claim 1, further comprising:

responsive to detecting an error when using the selected optimal communication protocol, triggering a fallback mechanism.

5. The method of claim 3, further comprising:

responsive to a communication failure during the communication of the data to the terminal using the first communication protocol:

stopping communication in the first communication protocol; and communicating the data to the terminal using the second communication protocol.

6. The method of claim 1, further comprising:

wherein determining the communication capability further comprises analyzing contextual data related to the other device.

7. The method of claim 6, wherein the contextual data comprises a location, devices available, or user preference.

8. The method of claim 1, further comprising:

receiving terminal information related to protocols used by the other device; and selecting at least one of a first and second communication protocols based on the terminal information.

9. The method of claim 1, further comprising:

retrieving protocol preferences of a user; and selecting at least one of a first and second communication protocols based on the protocol preferences of the user.

10. An apparatus for wireless data transfer, the apparatus comprising:

a memory element configured to store data; and at least one processor coupled to the memory element, the at least one processor configured to:

determine communication capability of another device for receiving data;

select, from a plurality of protocols including a one way communication protocol and a two-way communication protocol, an optimal communication protocol for communicating the data based on the determined communication capability, the one way communication protocol comprising a magnetic stripe transmission (MST) protocol; and communicate the data with the other device using the selected optimal communication protocol.

11. The apparatus of claim 10, wherein the at least one processor is further configured to:

determine whether a wireless signal, from the other device, using a first communication protocol is detected during a predetermined period of time;

responsive to detecting the wireless signal in the first communication protocol during the predetermined period of time, identify the first communication protocol as the selected optimal communication protocol; and responsive to failing to detect the wireless signal in the first communication protocol during the predetermined period of time, identify a second communication protocol as the selected optimal communication protocol.

12. The apparatus of claim 11, wherein the at least one processor is further configured to:

responsive to detecting the wireless signal in the first communication protocol during the communication of the data to a terminal using the second communication protocol:

stop communication of the data in the second communication protocol; and communicate the data to the terminal using the first communication protocol.

13. The apparatus of claim 10, wherein the at least one processor is further configured to:

responsive to detecting an error when using the selected optimal communication protocol, trigger a fallback mechanism.

14. The apparatus of claim 12, wherein the at least one processor is further configured to:

responsive to a communication failure during the communication of the data to the terminal using the first communication protocol:

stop communication in the first communication protocol; and communicate the data to the terminal using the second communication protocol.

15. The apparatus of claim 10, wherein the at least one processor is further configured to:

wherein determining the communication capability further comprises analyzing contextual data related to the other device.

16. The apparatus of claim 15, wherein the contextual data comprises a location, devices available, or user preference.

17. The apparatus of claim 10, wherein the at least one processor is further configured to:

receive terminal information related to protocols used by the other device; and select at least one of a first and second communication protocols based on the terminal information.

18. The apparatus of claim 10, wherein the at least one processor is further configured to:

retrieve protocol preferences of a user; and select at least one of a first and second communication protocols based on the protocol preferences of the user.

19. A non-transitory computer-readable medium including a plurality of instructions that, when executed by at least one processor, is configured to cause the processor to:

determine communication capability of another device for receiving data;

select, from a plurality of protocols including a one way communication protocol and a two-way communication protocol, an optimal communication protocol for communicating the data based on the determined communication capability, the one way communication protocol comprising a magnetic stripe transmission (MST) protocol; and communicate the data with the other device using the selected optimal communication protocol.

20. The non-transitory computer-readable medium of claim 19, wherein the plurality of instructions is further configured to cause the processor to:

determine whether a wireless signal, from the other device, using a first communication protocol is detected during a predetermined period of time;

responsive to detecting the wireless signal in the first communication protocol during the predetermined period of time, identify the first communication protocol as the selected optimal communication protocol; and responsive to failing to detect the wireless signal in the first communication protocol during the predetermined period of time, identify a second communication protocol as the selected optimal communication protocol.

* * * * *